United States Patent Office 3,544,893
Patented Dec. 1, 1970

3,544,893
APPARATUS FOR NONCONTACT MEASUREMENT OF SEMICONDUCTOR RESISTIVITY INCLUDING A TOROIDAL INDUCTIVE COIL WITH A GAP
Anatoly Ivanovich Savin, Ulitsa Dzerzhinskogo 24a, kv. 23; Alexandr Ivanovich Golubev, 1 Nagorny Mikroraion 16, kv. 81; and Valentina Mikhailovna Lomakina, Ulitsa Studenaya 37, kv. 5, all of Gorky, U.S.S.R.
Filed Aug. 5, 1968, Ser. No. 750,100
Int. Cl. G01r 27/02, 33/00
U.S. Cl. 324—62
2 Claims

ABSTRACT OF THE DISCLOSURE

Noncontact measuring of semiconductor resistivity is effected by passing semiconductor chips into a gap in a toroidal coil of a tank circuit and an absolute change in the Q-factor of said circuit is measured, which is indicative of the resistivity of said semiconductor chips. The circuit comprises a DC measuring bridge, and the toroidal coil is an HF self-oscillator connected in one of the arms of the bridge, a load being incorporated into the diagonal of the bridge and adapted to produce a signal indicative of the resistivity value of said chips.

---

The present invention relates to the field of electronic measurement and more particularly to the noncontact measurements of the resistivity of semiconductor material mainly silicon and germanium and particularly to apparatus which can be used in automatic and semiautomatic semiconductor sorting devices.

Commonly known is a noncontact method of measuring semiconductor resistivity consisting in measuring the Q-factor of a circuit incorporating a toroidal inductive coil with a gap. The semiconductor chip under the test is brought to the gap of the toroidal coil and the Q-factor of the circuit is measured. After that the Q-factor of the circuit is measured without the chip. The comparison results are indicative of the semiconductor resistivity.

A disadvantage of this method resides in that the chip under test is placed in a magnetic field of low strength, hence the measurement results depend to a great extent upon the size of the chip which results in considerable measurement errors.

The known noncontact semiconductor resistivity meters incorporate an inductive coil with a gap and a DC measuring bridge with a load in one of its diagonals from which a signal indicative of the resistivity value is derived. These meters feature comparatively low sensitivity and resolution of the measuring circuit which results in considerable measurement errors.

An object of the present invention is to overcome these disadvantages.

With these and other objects in view, a method of noncontact measurement of semiconductor resistivity according to the present invention resides in that the chip under test is brought into the gap of the inductive coil of the tank circuit and an absolute change in the circuit Q-factor is simultaneosuly measured.

To carry out this method an apparatus has been developed incorporating a DC measuring bridge with a load in one of its diagonals from which a signal indicative of the resistivity value is derived, and, according to the invention, with a HF oscillator in one of its arms, said oscillator being a self-oscillator with the circuit inductance in the form of a toroidal coil having a gap into which the chip under test is brought.

To provide for automatic measurement the signal indicative of the resistivity value should be converted into a pulse sequence of code pulses. For this purpose, in the apparatus provided by the invention employed is a self-oscillator as a HF oscillator with the circuit inductance in the form of a toroidal coil having a gap into which the chip under test is brought, and for converting the electric signal into a pulse sequence, connected as a load into the bridge diagonal is a DC/AC converter coupled to a comparator which triggers a linear ramp oscillator and a counting pulse sequence generator, the number of said pulses being indicative of the resistivity value, and the output of said linear ramp oscillator is connected to the circuit inductance of the HF oscillator which ensures compensation of the bridge unbalance within one measurement cycle.

The invention will be more clear from the following detailed description, taken along with the accompanying drawings, in which:

FIG. 3 is a waveform of the voltage $U_1$ at the amplifier-limiter output;

FIG. 4 is a waveform of the voltage $U_2$ of the linear ramp oscillator; and

FIG. 5 shows schematically the output signal of the counting pulse sequence generator.

Figure 1:
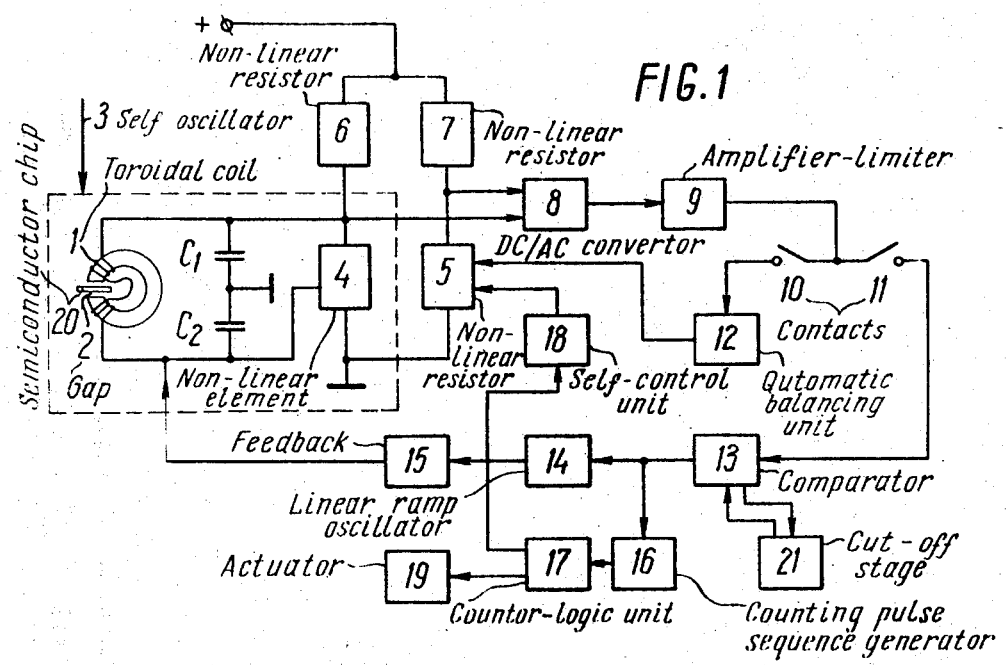
FIG. 1 is a block diagram of the apparatus according to the invention.
Figure 2:
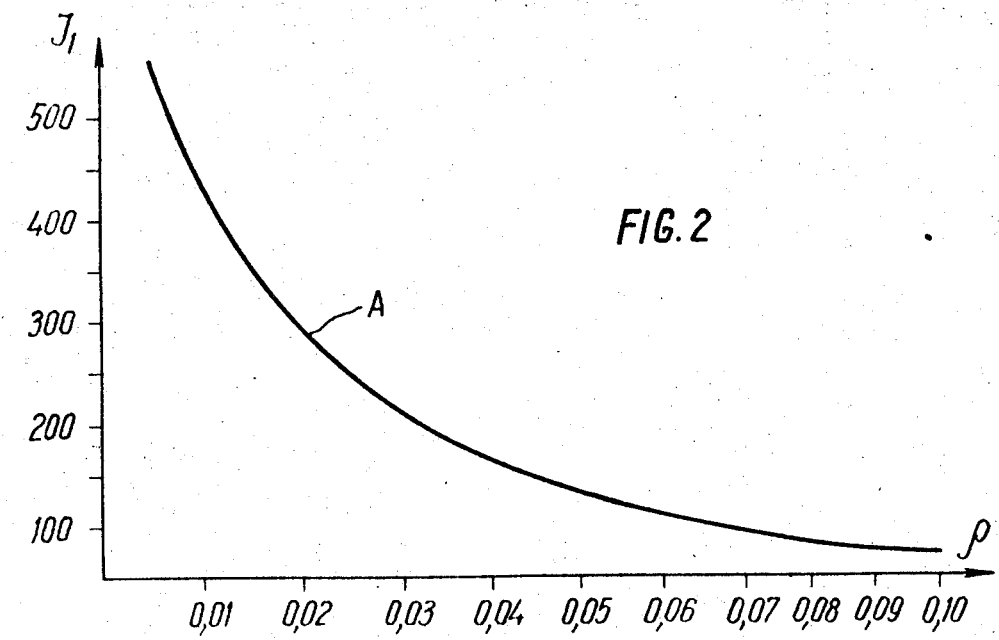
FIG. 2 is a graph of the current vs. the semiconductor resistivity.

The apparatus (FIG. 1) for measuring resistivity of semiconductor chips is designed for automatic operation but it can also be operated manually.

The apparatus incorporates the following units and components: a toroidal coil 1 with a gap 2 included in the circuit of a self-oscillator 3 which employs a nonlinear element 4 and capacitors $C_1$ and $C_2$. The self-oscillator 3 is connected to one of the bridge arms incorporating nonlinear resistors 5, 6 and 7. A DC/AC convertor 8 is cut into the bridge diagonals. The output of the convertor 8 is coupled with the input of an amplifier-limiter 9, the output of which is connected in operation via contacts 10 and 11 to an automatic balancing unit 12 and comparator 13; the output of the automatic balancing unit 12 is coupled with the nonlinear resistor 5 of the measuring bridge; the comparator 13 is connected to the linear ramp oscillator 14 which is linked through a feedback 15 to the toroidal coil 1.

The apparatus also incorporates a counting pulse sequence generator 16 the input of which is coupled with the output of the comparator 13 and its output with the input of a counter-logic unit 17.

The counter-logic unit 17 is connected to a self-control unit 18 and an actuator 19.

The apparatus operates in the following manner.

A semiconductor chip 20 is brought into the gap 2 of the toroidal coil 1 whose inductance is an intrinsic part of the self-oscillator 3 circuit. The magnetic flux in the gap of the toroidal coil 1 is focused in a narrow beam whose cross-section is less than the surface area of the semiconductor chip 20. This results in a decrease of measurement errors caused by variations of chip sizes. As the chip 20 is being introduced into the gap, eddy currents are induced in it, which results in a decrease of the Q-factor of the circuit formed by the components 1, $C_1$ and $C_2$ connected to the nonlinear element 4 as well as in a decrease of the signal amplitude of the self-oscillator 3 and in a change of the element 4 resistance.

The measuring bridge in its initial state is balanced. After the chip 20 is introduced into the gap and as a result of the resistance change of the element 4, a diagonal current makes its appearance in the load 8 of the bridge diagonal whose value is indicative of the Q-factor change of the tank circuit 3, and hence of the chip 20 resistivity, which can be read off indicating instrument (not shown in the drawing) incorporated in the convertor 8.

To provide for direct reading of the chip resistivity, the apparatus should be calibrated in advance. For this purpose, reference chips, that is, chips whose resistivity is known, are introduced in the gap 2 of coil 1, and by the bridge unbalance current measured by the indicator a curve A of current I is plotted as a function of resistivity S.

In this manner the device is operated manually.

To ensure automatic measurement of resistivity and sorting out the chips according to their resistivity, the bridge unbalance direct current is converted to an alternating current. This current passes through the amplifier-limiter 9 (curve B, FIG. 3), enables the comparator 13 and triggers the linear ramp oscillator 14 (curve C, FIG. 4).

Compensating signal of oscillator 14 passes through feedback 15 to the toroidal coil 1, and tends to reduce the bridge unbalance current down to the level determined by the comparator 13.

As the unbalance current is compensated, the comparator 13 is cut off, and a pulse directly proportional to the unbalance current value and inversely proportional to the resistivity of the chip 20 appears at its output. This pulse is applied to the counting pulse sequence generator 16 triggering it for the measurement period $\tau$. During this period the generator 16 generates N number of pulses (FIG. 5) which is inversely proportional to the resistivity value.

N pulse sequence is fed to the counter-logic unit 17.

To provide for sorting out semiconductor chips in groups, a program is introduced into the counter-logic unit 17, which ensures operation of a signaling system (not shown in the drawing) of the actuator 19, which directs the measured chip into one or another bin (not shown in the drawing), depending on its resistivity.

To eliminate the bridge unbalance after single measurement, the comparator 13 is cut off till the next measurement by a pulse from a cutoff stage 21 which is triggered by the trailing edge of the pulse from the comparator 13. After the chip 20 is taken out of the gap 2 of the toroidal coil 1, the comparator 13 is switched off the output of the amplifier-limiter 9 by means of contact 11 and connected through contact 10 to the automatic balancing unit 12. The unit 12 keeps the bridge in balanced state in the interval between measurements by adjusting the nonlinear resistor 5.

To automatically check at regular intervals the operation of the apparatus after a certain number of measurements, instead of introducing a reference chip, a pulse is fed from the self-control unit 18 to the nonlinear resistor 5, whose width corresponds to the measurement period with the minimum resistivity of the chip. In this case the unbalance current is converted in the above-described manner into a number of pulses which is compared in the counter-logic unit 17 with two pulse sequences which determine the permissible measurement accuracy range.

Application of the apparatus for measuring semiconductor resistivity ensures 2- to 3-fold improvement of the measurement accuracy as compared with that of the conventional instruments.

The apparatus proposed herein is reliable in operation, simple in service and ensures quick change of measuring and sorting programs which is especially useful in the production of semiconductor electronic devices.

What is claimed is:

1. An instrument for measuring the resistivity of a semiconductor material comprising a toroidal inductive coil with a gap into which a test semiconductor lamella is passed in measuring the resistivity thereof; a high-frequency self-oscillator provided with an oscillatory circuit whose inductance is represented by said toroidal coil; a direct current measuring bridge with one arm connected to said high-frequency oscillator, the unbalance of said bridge varying in proportion to the change of the Q-factor of said oscillatory circuit when the test material is passed into the gap of said toroidal coil; a load applied to said bridge diagonal and generating an output signal of said bridge; a recorder to register electric signals generated under load, said recorder being connected to said load.

2. An instrument for measuring the resistivity of a semiconductor material comprising a toroidal inductive core with a gap into which a test semiconductor lamella is passed in measuring the resistivity thereof; a high-frequency self-oscillator provided with an oscillatory circuit whose inductance is represented by said toroidal coil; a direct current measuring bridge with one arm connected to said high-frequency oscillator, the unbalance of said bridge varying in proportion to the change of the Q-factor of said oscillatory circuit when the test material is passed into the gap of said toroidal coil; a direct current-to-alternating current converter connected to said bridge diagonal; an electrical comparison circuit connected to the output of said converter and operated by a signal indicative of the bridge unbalance; a linear ramp oscillator whose input is connected to the output of said comparison circuit and whose output is electrically connected to an inductive coil, said linear ramp oscillator generating an electric signal compensating for the bridge unbalance until the comparison circuit closes; a counting code pulse sequence generator connected to the output of the comparison circuit, said generator producing code pulses from the moment of the comparison circuit operation until the moment of its closure, the number of said code pulses indicating the resistivity value; and counting logic means connected to the output of said counting code pulse generator for counting the code pulses generated.

References Cited

UNITED STATES PATENTS 3,234,461  2/1966  Trent et al. ......... 324—40X

EDWARD E. KUBASIEWICZ, Primary Examiner

U.S. Cl. X.R.

324—34